United States Patent Office 2,931,389
Patented Apr. 5, 1960

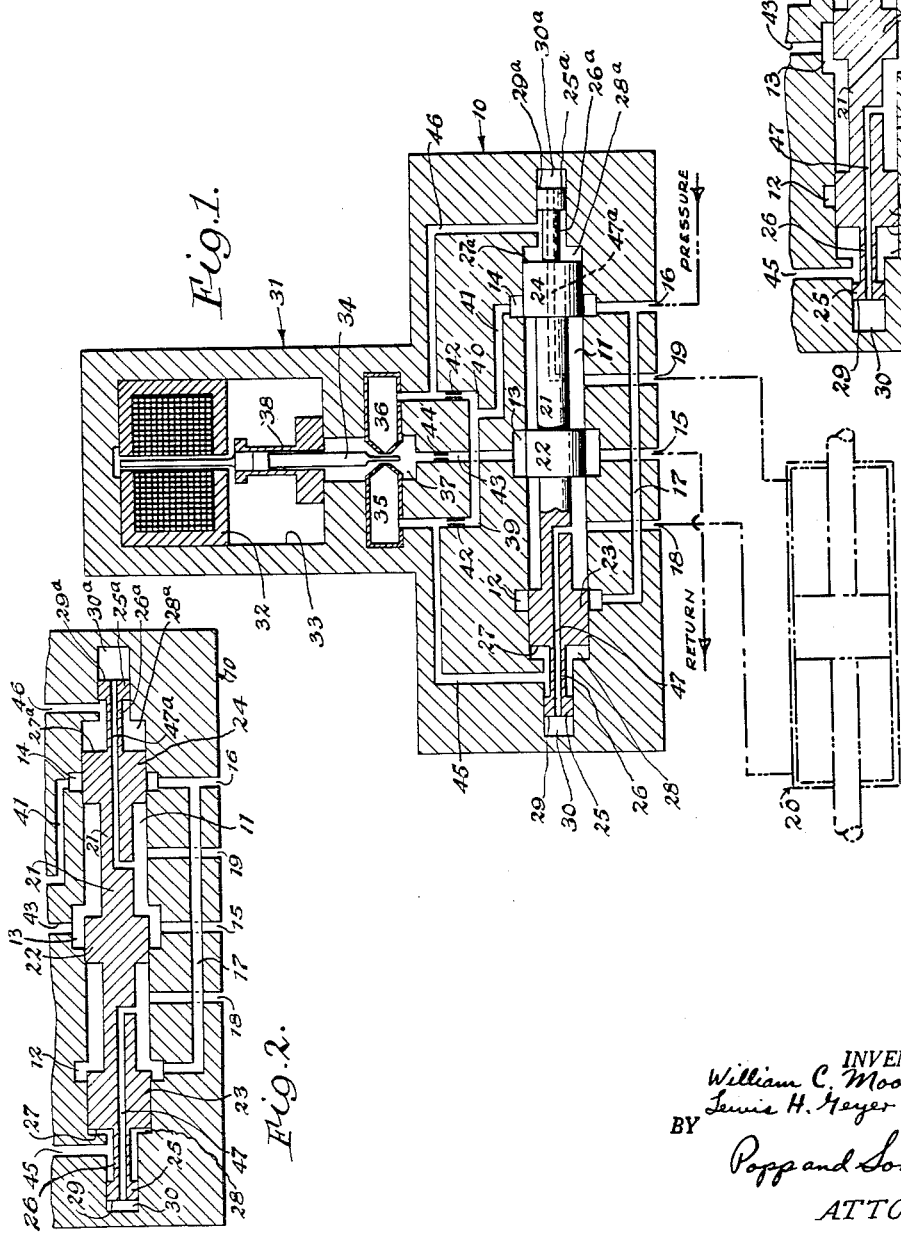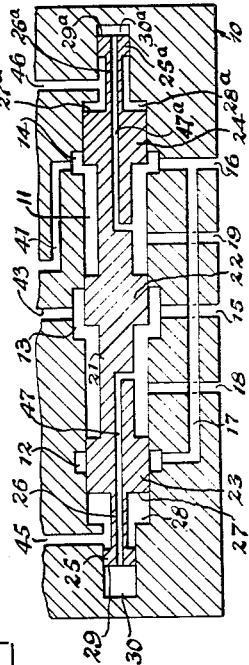

2,931,389

SERVO VALVE PRODUCING OUTPUT DIFFERENTIAL PRESSURE INDEPENDENT OF FLOW RATE

William C. Moog, Jr., and Lewis H. Geyer, East Aurora, N.Y., assignors to Moog Servocontrols, Inc.

Application April 18, 1956, Serial No. 578,929

3 Claims. (Cl. 137—623)

This invention relates to improvements in pressure control servo valves and particularly of the electro-hydraulic type.

As is conventional with servo valves, the pressure control servo valve of the present invention includes a chamber having inlet, outlet and actuating ports and a valve spool slidably arranged in said chamber for controlling the flow of fluid through said ports to and from external hydraulic machinery to be actuated.

However, unlike conventional servo valves in which the valve spool is displaced hydraulically to determine the output flow rate of the valve, it is the fundamental purpose of the present invention to provide a pressure control servo valve which develops across the load a pressure drop which is proportionate to a control input to the valve and independent of flow rate.

While the hydraulic drive on the valve spool may be induced or controlled in any suitable manner, it is preferred to electrically induce or control such drive, and particularly by means which produce a hydraulic drive proportionate to an electrical input signal applied to the valve.

Accordingly, in such preferred embodiment, the primary object of the present invention is to provide a pressure control servo valve which produces in the actuating ports of the valve a pressure differential proportionate to the electrical input signal applied to the valve and hence produce a pressure drop across the load provided by external hydraulic machinery with which the servo valve is associated.

Another important object is to provide such a valve which has a small size and low weight.

Other objects and advantages of the present invention will be apparent from the following detailed description taken in conjunction with the accompanying drawings wherein:

Fig. 1 is a vertical central sectional view through an electro-hydraulic pressure control servo valve embodying the present invention and illustrating the internal construction of the valve in a more or less diagrammatic manner and with the valve spool in a neutral position.

Fig. 2 is a fragmentary view of that portion of the valve body shown in Fig. 1 which houses the valve spool and showing such spool in a position to the left of neutral.

Fig. 3 is a similar view but showing the valve spool in a position to the right of neutral.

Referring to the drawings, the valve is shown as having a body 10 provided with an elongated cylindrical chamber 11 having reduced end portions at opposite ends. The body wall of the chamber in its central enlarged region is shown as provided with three annular grooves 12, 13 and 14 at axially spaced intervals therealong. The central groove 13 is shown as communicating with a return or drain port 15. The groove 14 is shown as communicating with a pressure port 16, and the groove 12 via a fluid channel 17 is also shown as communicating with the pressure port 16. The portion of the chamber 11 between the grooves 12 and 13 is shown as being in communication with an actuating port 18. The portion of the chamber 11 between the grooves 13 and 14 is shown as being in communication with a second actuating port 19. The pressure port 16 and return port 15 are connected with any suitable hydraulic system (not shown). The actuating ports 18 and 19 are connected with external hydraulic machinery indicated schematically and represented by the numeral 20. Thus, the servo valve has inlet, outlet and actuating ports for supplying and receiving fluid to and from the external hydraulic machinery 20 to be actuated.

A valve spool 21 is slidably arranged in the chamber 11 and is shown as having a central lobe 22 and two end lobes 23 and 24. When the valve spool 21 is in its centered or neutral position as shown in Fig. 1, the central lobe 22 covers the central annular groove 13, and the end lobes 23 and 24 cover the end grooves 12 and 14. In this centered or neutral position of the valve spool, neither actuating port 18 or 19 has communication with either the pressure port 16 or the drain port 15.

A piston head is shown as being slidably arranged in the reduced end portion of the chamber 11 at each end of the valve spool. One such piston head is indicated at 25 and the other at 25a. Each piston head 25, 25a is axially spaced outwardly from the corresponding end of the valve spool and is shown as being integrally connected thereto by a stem, indicated at 26 for the piston head 25 and at 26a for the other piston head 25a. The portion of the chamber 11 between the inner end face of the piston head 25 and the outer end face 27 of the end lobe 23 provides a hydraulic drive chamber 28. A similar drive chamber 28a is provided between the inner end face of the piston head 25a and the outer end face 27a of the end lobe 24. The portion of the chamber 11 between the outer end face 29 of the piston head 25 and the adjacent end wall of this main chamber provides an end chamber 30. A similar end chamber 30a is provided between the outer end face 29a of the piston head 25a and the adjacent end wall of the main chamber 11.

Means are provided for producing a pressure differential in the spool drive chambers 28 and 28a so as to drive the spool 21 hydraulically. Such means are shown as including an electro-hydraulic amplifier first stage, represented generally by the numeral 31, which produces an output pressure differential proportionate to an electrical signal input.

The preferred electro-hydraulic amplifier 31 is shown as having a solenoid or torque motor 32 arranged in a compartment 33 in the valve body, and adapted to move a pressure regulator member 34. A pair of nozzles 35 and 36 are arranged in a separate compartment 37 which provides a sump chamber. The end portion of the pressure regulator member 34 remote from the torque motor 32 extends between the discharge openings of the nozzles 35 and 36 and in a variably spaced relation thereto. The pressure regulator member 34 intermediate its ends is mounted on a flexure tube 38. The position of the flapper portion of the pressure regulator member with respect to the discharge openings of the nozzles 35 and 36 provides variable annular orifices which develop a pressure differential within the nozzle chambers or interiors.

It will be observed that the solenoid or torque motor 32 is isolated from the sump chamber 37 into which the nozzles 35 and 36 discharge fluid. Such a dry solenoid type of electro-hydraulic amplifier is more fully described as to construction and operation in the patent application of William C. Moog, Jr., Serial No. 560,753, filed January 23, 1956, and entitled Fluid Control Valve. Instead of the preferred dry solenoid type of first stage amplifier shown, an immersed solenoid type can be employed such as is fully described in another patent application of said William C. Moog, Jr., Serial No. 356,631, filed May 22, 1953, and entitled Electrohydraulic Servo Mechanism, now Patent No. 2,767,689 issued October 23, 1956. Both such types of electro-hydraulic amplifiers are of the balanced nozzle design and, regardless of which type is employed in the practice of the present invention, provide an output pressure differential proportionate to the electrical signal input to the solenoid or torque motor 32. Such hydraulic amplifiers provide a high force level output push-pull hydraulic drive with completely frictionless operation and excellent dynamic performance while requiring very little input signal.

Means are provided for supplying the electro-hydraulic amplifier 31 with fluid derived from the hydraulic system connected to the pressure and return ports 16 and 15, respectively. As shown, the fluid feed is by means of independent branch fluid feed channels 39 and 40 severally communicating at one end with the chambers or interiors of the nozzles 35 and 36, respectively. At their other ends the channels 39 and 40 communicate with a main fluid feed channel 41 which leads to the annular pressure groove 14, in turn connected to the pressure port 16. Each of the channels 39 and 40 is shown as having a restriction 42 therein so that fluid supplied to the nozzles is at a lower pressure than the hydraulic system supply pressure applied to the port 16. The fluid drain channel 43 having a restriction 44 therein is shown as placing the sump chamber 37 in communication with the annular drain groove 13, in turn connected to the return port 15.

Means are shown for applying the pressure differential created by the nozzles 35 and 36 to the spool drive chambers 28 and 28a so that this pressure differential can be utilized to drive hydraulically the valve spool 21. Such means are shown as including fluid channels 45 and 46. The channel 45 at one end communicates with the fluid feed branch channel 39 on the downstream side of the restriction 42 therein, and the opposite end of the channel 45 communicates with the left spool drive chamber 28, as viewed in Fig. 1. The fluid channel 46 is shown as communicating with the fluid feed branch channel 40 on the downstream side of the restriction 42 therein, and the other end of this channel 46 communicates with the right drive chamber 28a, as viewed in Fig. 1. Thus, the respective output pressures developed by the nozzles 35 and 36 are applied severally to the end faces 27 and 27a, respectively, at opposite ends of the valve spool 21.

Means are provided for establishing communication between the actuating ports 18 and 19 and the respective end chambers 30 and 30a. As shown, such means for the end chamber 30 include a fluid by-pass channel 47 which has an axial portion extending from the piston head end face 29 to a place intermediate the central lobe 22 and end lobe 23 of the valve spoole 21, and a radial portion opening to the portion of the chamber 11 between such lobes. A similar by-pas channel 47a is provided for the end chamber 30a, this channel connecting such end chamber with the space between the central lobe 22 and end lobe 24 of the valve spool. Thus, the end chamber 30 and actuating port 18 have the same pressure, and the other end chamber 30a and other actuating port 19 have the same pressure.

It is pointed out that the piston head end faces 29 and 29a are of equal area, as are the spool end faces 27 and 27a, although the faces 27, 27a are shown as larger in area than the faces 29, 29a. The ratio of the area 27 to the area 29 is equal to the ratio of the amplifier output pressure produced in the drive chamber 28 to the output pressure in the related actuating port 18. These same ratios apply at the opposite end of the valve spool, as related to the other actuating port 19.

Assuming that there is no electrical input signal to the hydraulic amplifier first stage 31, the output pressures in the nozzle chambers 35 and 36 will be the same and the valve spool 21 will assume its neutral position shown in Fig. 1, provided there is no pressure drop across the load created by the external hydraulic machinery, in which case the pressure of the fluid in the actuating ports 18 and 19 will likewise be the same.

Assume now that an electrical input signal is applied so as to induce a pressure differential in the nozzle chambers 35 and 36 with the pressure in chamber 36 being higher than that in chamber 35. This pressure differential establishes a higher pressure in the drive chamber 28a than in the drive chamber 28 and disturbs the force balance on the valve spool 21 so that the valve spool is driven to the left as viewed in the figures of the drawings. Referring to Fig. 2, the position of the valve spool 21 displaced to the left of neutral is shown. It will be seen that the lobe 23 has partially uncovered the annular pressure groove 12 so as to establish communication between this groove and the actuating port 18. At the same time, the pressure in this actuating port 18 is transmitted via the by-pass channel 47 to the end chamber 30. It will also be noted that the center lobe 22 has moved so as to partially uncover the central annular return groove 13 and thereby establish communication between this groove and the other actuating port 19. The pressure of the fluid in this actuating port 19 is transmitted via the by-pass channel 47a to the end chamber 30a.

Inasmuch as this produces a flow from the pressure port 16, through the channel 17, groove 12, into the annular space between the lobes 22 and 23, from which space fluid can flow through the actuating port 18 into the external hydraulic machinery 20 on the left side of the piston thereof, a certain pressure will be produced in the actuating port 18. This same pressure is transmitted to the end chamber 30 through the by-pass channel 47. The other or right side of the piston of the external hydraulic machinery 20 is connected through the actuating port 19, the annular space between the spool lobes 22 and 24, the central annular groove 13, to the drain port 15. The pressure in this actuating port 19 is transmitted to the end chamber 30a through the by-pass chanel 47a. Thus it will be seen that the pressures in actuating ports 18 and 19 are communicated to the end faces 29 and 29a respectively so that the difference between these pressures produces a force on the valve spool 21 which is balanced by the force developed by the driving pressures acting on the end faces 27 and 27a.

The valve spool 21 will remain in a variable displaced position to the left of neutral shown in Fig. 2 as long as fluid flow is required to displace the piston of the external hydraulic machinery since an equilibrium force balance on the valve spool has not yet been achieved. However, as movement of this piston ceases, the valve spool 21 returns from the displaced position shown in Fig. 2 to the centered or neutral position shown in Fig. 1 so as to establish an equilibrium force balance on the valve spool, this by maintaining a pressure differential in the actuating ports 18 and 19 as a result of load reaction and which is proportionate to the electrical input signal. Thus, a pressure differential is established in the actuating ports 18 and 19 which is proportionate to the pressure differential established in the nozzle chambers 35 and 36 and hence proportionate to the electrical input signal to the amplifier 31.

Assuming now that the electrical input signal is so varied that the pressure differential in the nozzle chambers 35 and 36 changes with the result that the pressure in the nozzle chamber 36 decreases and the pressure in the nozzle chamber 35 increases, the following occurs. The valve spool 21 shifts to the right as shown in Fig. 3, following the decrease in pressure in the drive chamber 28a and increase in pressure in the drive chamber 28. It will now be seen that the annular pressure groove 14 is uncovered by the lobe 24 and placed in communication with the actuating port 19, the pressure therein being transmitted to the end chamber 30a via the by-pass channel 47a. At the same time, the center lobe 22 uncovers the annular return groove 13 so as to place this groove in communication with the actuating port 18, the pressure therein being transmitted to the end chamber 30 via the by-pass channel 47a. Thus, the same condition explained above is created but only in a reversed relationship as far as the actuating ports 18 and 19 are concerned. A pressure drop across the piston of the external hydraulic machinery 20 is now established with the higher pressure being to the right of the piston and the lower pressure to the left of the piston and this pressure differential will be maintained as a result of load reaction and proportionate to the electrical input signal.

If the piston of the external hydraulic machinery is urged to move by means other than the servo valve, it will be seen that these externally applied forces will react through the actuating ports 18 and 19 upon the end faces 29, 29a so as to shift the valve spool 21 in order to maintain the equilibrium force balance on the valve spool and hence the pressure differential in the actuating ports demanded by the electrical input signal.

Of course, suitable filtering means may be incorporated in the hydraulic circuit of the present pressure control servo valve at various places in order to maintain the hydraulic fluid free of foreign material. Such filtering means have not been illustrated herein in order to confine the disclosure to the essentials of the valve.

From the foregoing, it will be seen that the present invention provides a pressure control servo valve which creates a pressure differential between the actuating ports of a four-way valve which is proportional to the applied electrical input signal. Specifically, the valve features a hydraulic amplifier which applies a driving pressure proportionate to the input signal to an end area of a four-way valve spool. This driving pressure from the first stage hydraulic amplifier is balanced by the pressure difference developed between the actuating ports as a result of load reaction.

It is to be noted that the ratio of the areas of the spool end faces 27, 27a on the one hand and the piston head end faces 29, 29a on the other hand may be designed as desired in order to produce the specific ratio of the pressure differential to be developed in the actuating ports 18 and 19 with respect to the pressure differential established in the nozzle chambers 35 and 36 in response to a given electrical input signal.

We claim:

1. In an electro-hydraulic pressure control servo valve, a chamber having inlet, outlet and actuating ports for supplying and receiving fluid to and from external hydraulic machinery to be actuated, a valve spool slidably arranged in said chamber for controlling fluid flow through said ports, said spool having first areas at opposite ends thereof and also having second areas at opposite ends thereof, means for hydraulically driving said spool including hydraulic amplifier means arranged to produce an output pressure differential proportionate to an electrical input signal to the valve and means arranged to apply said pressure differential to said first opposite end areas, and means for producing in said actuating ports a second pressure differential proportionate to said first mentioned pressure differential including means for establishing constant communication severally between said actuating ports and second opposite end areas, whereby the spool driving pressure is balanced by the pressure difference developed between said actuating ports as a result of load reaction.

2. In an electro-hydraulic pressure control servo valve, a chamber having axially spaced inlet, outlet and actuating ports for supplying and receiving fluid to and from external hydraulic machinery to be actuated, a valve spool slidably arranged in said chamber and having lobes so positioned as to close said inlet and outlet ports when said spool is in a neutral position, said chamber adjacent each end having a portion of different diameter from the intermediate portion occupied by said spool, a piston connected to each end of said spool and extending axially outwardly therefrom and slidably arranged in the corresponding one of said different diametered portions, the portion of said chamber between each of said different diametered portions and the corresponding end of said spool providing a hydraulic driving chamber, the portion of said first mentioned chamber between each of said pistons and the corresponding end wall of said first mentioned chamber providing an end chamber, means for hydraulically driving said spool including hydraulic amplifier means arranged to produce two output pressures having a difference in value proportionate to an electrical input signal to the valve and means arranged to apply said output pressures severally to said driving chambers, and means for establishing communication severally between said actuating ports and end chambers, whereby the spool driving pressure is balanced by the pressure difference developed between said actuating ports as a result of load reaction.

3. The combination as set forth in claim 2 wherein the means for establishing communication severally between said actuating ports and end chambers comprises a by-pass fluid channel provided in said piston and spool.

References Cited in the file of this patent

UNITED STATES PATENTS

| | | |
|---|---|---|
| 2,293,293 | Harcum | Aug. 18, 1942 |
| 2,400,126 | Matthews | May 14, 1946 |
| 2,709,421 | Avery | May 31, 1955 |

FOREIGN PATENTS

| | | |
|---|---|---|
| 730,965 | Great Britain | June 1, 1955 |

UNITED STATES PATENT OFFICE
CERTIFICATE OF CORRECTION

Patent No. 2,931,389                                          April 5, 1960

William C. Moog, Jr., et al.

It is hereby certified that error appears in the above numbered patent requiring correction and that the said Letters Patent should read as corrected below.

Column 2, line 66, for "560,753" read -- 560,573 --.

Signed and sealed this 28th day of November 1967.

(SEAL)
Attest:

Edward M. Fletcher, Jr.
Attesting Officer

EDWARD J. BRENNER
Commissioner of Patents